(12) United States Patent
Kalagananam et al.

(10) Patent No.: US 8,516,501 B2
(45) Date of Patent: Aug. 20, 2013

(54) DEEP COPYING OBJECTS IN A COLLOCATED ENVIRONMENT

(75) Inventors: Aruna A. Kalagananam, Bangalore (IN); Derek B. Inglis, Markham (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/854,198

(22) Filed: Aug. 11, 2010

(65) Prior Publication Data
US 2012/0042325 A1 Feb. 16, 2012

(51) Int. Cl.
*G06F 9/44* (2006.01)
(52) U.S. Cl.
USPC .......................................... 719/316; 717/166
(58) Field of Classification Search
USPC .................. 719/310, 316; 717/166
See application file for complete search history.

(56) References Cited

U.S. PATENT DOCUMENTS

| | | | | |
|---|---|---|---|---|
| 6,289,382 B1 * | 9/2001 | Bowman-Amuah | .......... | 709/226 |
| 6,301,582 B1 * | 10/2001 | Johnson et al. | ....................... | 1/1 |
| 6,851,111 B2 * | 2/2005 | McGuire et al. | ............... | 717/166 |
| 7,003,782 B2 * | 2/2006 | Baldwin et al. | ................ | 719/330 |
| 7,415,704 B2 * | 8/2008 | Schmidt et al. | ................ | 717/166 |
| 7,587,721 B2 * | 9/2009 | Schmidt et al. | ................ | 719/319 |
| 7,614,045 B2 * | 11/2009 | Kuck et al. | ..................... | 717/166 |
| 8,127,288 B2 * | 2/2012 | Moore et al. | ................... | 717/178 |
| 2004/0064823 A1 * | 4/2004 | Baldwin et al. | ................ | 719/315 |
| 2006/0107222 A1 * | 5/2006 | Gallagher | ...................... | 715/762 |
| 2008/0022376 A1 * | 1/2008 | Ke et al. | ............................ | 726/5 |
| 2010/0083277 A1 | 4/2010 | Malladi | | |

OTHER PUBLICATIONS

Breg F et al: "Java Virtual Machine Support for Object Serialization", Proceedings of the 2001 joint ACM-ISCOPE conference on Java Grande, 2001, pp. 173-180.

* cited by examiner

*Primary Examiner* — Van Nguyen
(74) *Attorney, Agent, or Firm* — Jordan IP Law, LLC

(57) ABSTRACT

Systems and methods of passing arguments between client and server contexts may provide for detecting an in-process call between a client and a server, wherein the client and the server share a common virtual machine instance. An object copy from a source object of the in-process call to a destination object can be conducted based on an internal class structure of the virtual machine instance. The object copy procedure may be repeated for a plurality of source objects of the in-process call.

13 Claims, 3 Drawing Sheets

FIG. 1
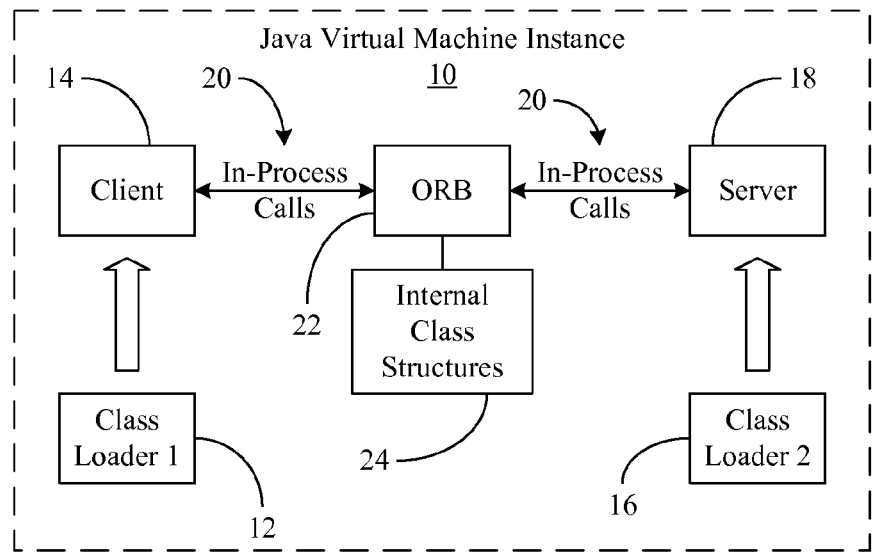
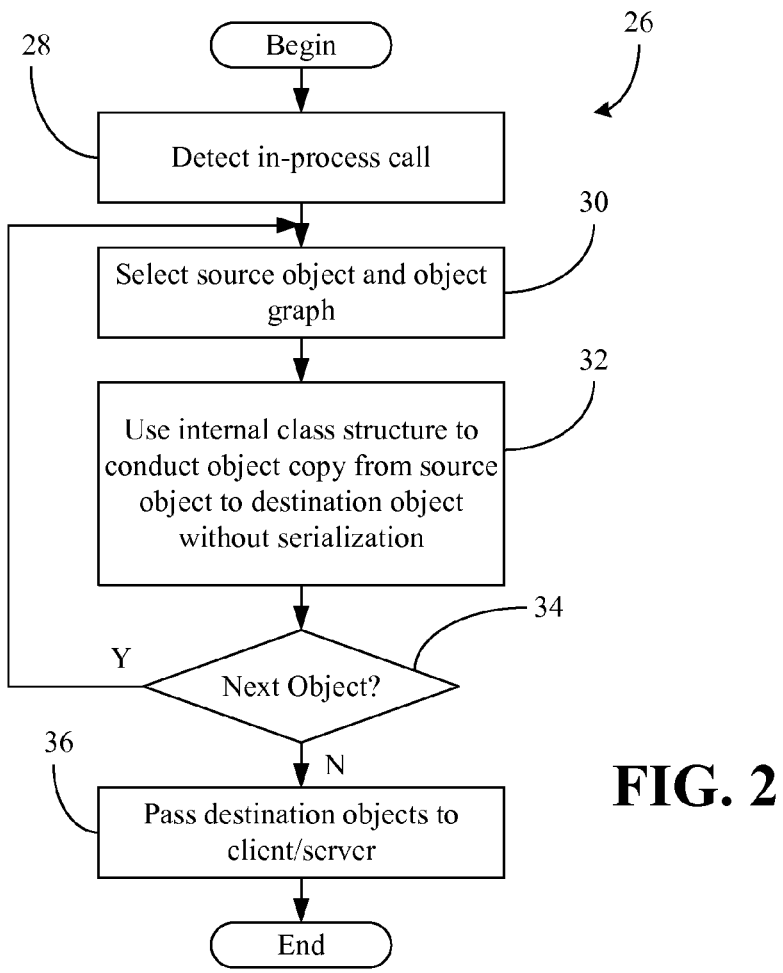
FIG. 2

DEEP COPYING OBJECTS IN A COLLOCATED ENVIRONMENT

BACKGROUND

1. Technical Field

Embodiments of the present invention generally relate to object request broker (ORB) communications in a collocated environment. More particularly, embodiments relate to the leveraging of internal class structures to improve the performance of ORB calls in a collocated environment.

2. Discussion

A typical communication between client and server ORBs can be through sockets. If the server and client exist in a single Java™ virtual machine (JVM) instance and are connected to a common ORB instance, however, then the communication may not be a socket call, but an optimized in-process call (e.g., a "collocated" call). In this scenario, the client and server could be loaded by different class loaders, which may require that arguments passed between the client and server contexts be copied.

Conventional solutions can use ORB serialization-deserialization to copy the parameters. For example, on the client side, the arguments might be serialized into a buffer, which is then passed to the server context. The server side may then deserialize the arguments from the buffer and instantiate the objects in its class loader context. The process of serialization-deserialization can be quite slow and may have a negative impact on performance.

BRIEF SUMMARY

Embodiments may provide for a method in which an in-process call between a client and a server is detected, wherein the client and the server share a common virtual machine instance. An object copy can be conducted from a source object of the in-process call to a destination object based on an internal class structure of the virtual machine instance. The method may also provide for repeating the object copy for a plurality of source objects in the in-process call.

Embodiments can also include a computer program product including a computer readable storage medium and computer usable code stored on the computer readable storage medium, where, if executed by a processor, the computer usable code causes a computer to detect an in-process call between a client and a server. The client and the server may share a common virtual machine instance. The computer usable code can also be executed to conduct an object copy from a source object of the in-process call to a destination object based on an internal class structure of the virtual machine instance. In addition, if executed, the computer usable code may cause a computer to repeat the object copy for a plurality of source objects in the in-process call.

Other embodiments may involve a method in which an in-process call between a client and a server is detected, wherein the client and the server share a common virtual machine instance, and wherein the in-process call includes a source object. An internal class structure of the virtual machine can be determined based on an object type of the source object, and field offset data may be identified in the internal class structure. The method can also provide for conducting a field copy from the source object to a destination object based on the field offset data, wherein the source object corresponds to a first class loader and the destination object corresponds to a second class loader. The field copy may be repeated for a plurality of fields in the source object to complete an object copy of the source object. In addition, the object copy can be repeated for a plurality of source objects in the in-process call.

Embodiments can also include a computer program product including a computer readable storage medium and computer usable code stored on the computer readable storage medium, where, if executed by a processor, the computer usable code causes a computer to detect an in-process call between a client and a server. The client and the server may share a common virtual machine instance, and the in-process call can include a source object. The computer usable code may also be executed to determine an internal class structure of the virtual machine instance based on an object type of the source object, and to identify field offset data in the internal class structure. If executed, the computer usable code can conduct a field copy from the source object to a destination object based on the field offset data, wherein the source object is to correspond to a first class loader and the destination object is to correspond to second class loader. In addition, the computer usable code can cause a computer to repeat the field copy for a plurality of fields in the source object to complete an object copy of the source object, and to repeat the object copy for a plurality of source objects in the in-process call.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 1 is a block diagram of an example of a collocated environment according to an embodiment;

FIG. 2 is a flowchart of an example of a method of conducting object copies for in-process calls according to an embodiment;

DETAILED DESCRIPTION

Figure 3:
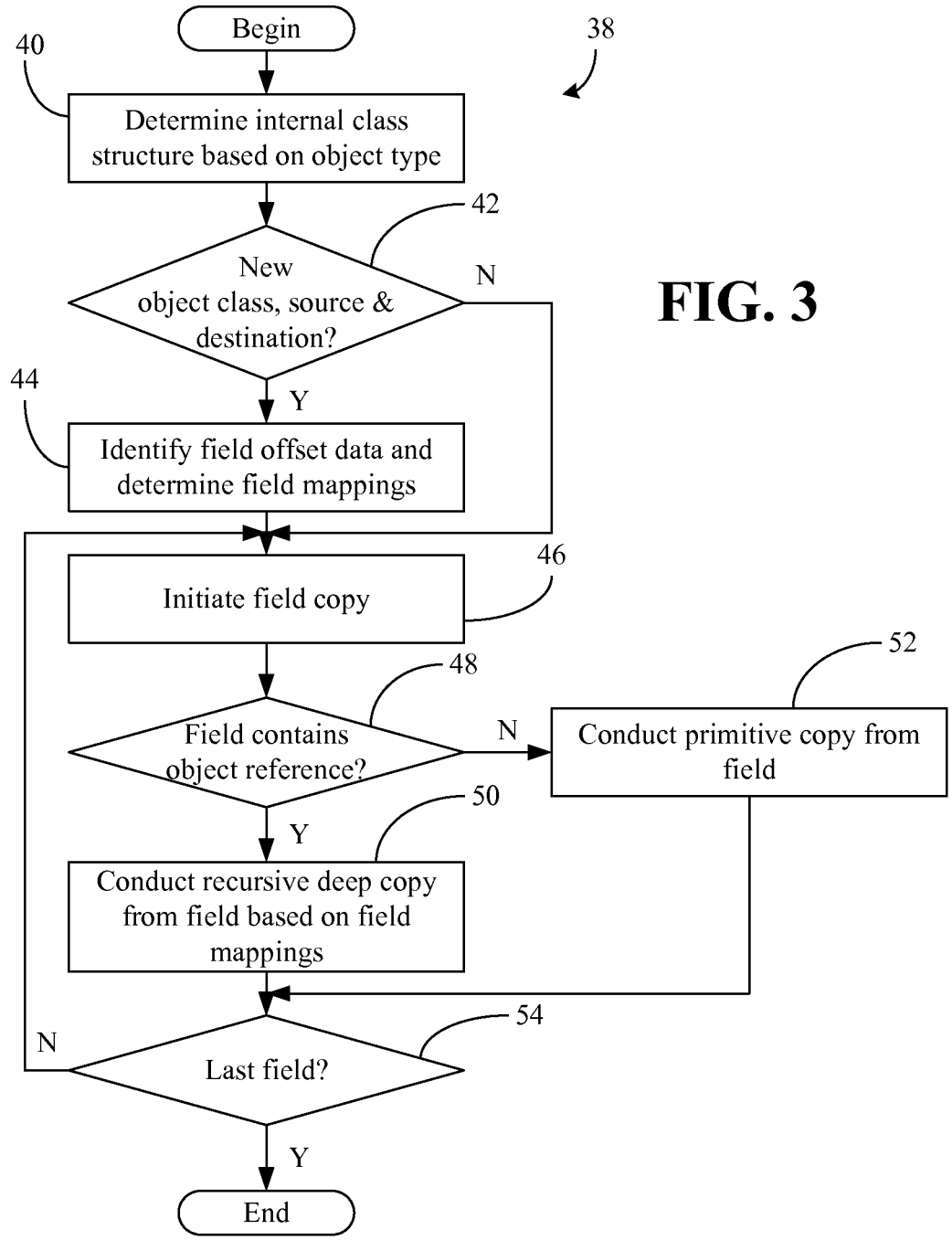
FIG. 3 is a flowchart of an example of a method of conducting field copies from source objects to destination objects according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a Java™ Virtual Machine (JVM) instance 10 is shown in which a first class loader 12 of the JVM instance 10 loads a client context 14, and a second class loader 16 of the JVM instance 10 loads a server context 18. The client and server contexts 14, 18 could also be conceptualized as being part of the first and second class loaders 12, 16, respectively. In the illustrated example, the client and server contexts 14, 18 issue in-process calls 20 to one another via an object request broker (ORB) 22, which may generally handle the transformation of in-process data structures to a byte sequence that is transmitted over a network (not shown). Rather than serializing and deserializing the in-process calls 20, the ORB 22 uses internal class structures 24 to directly copy in-process call parameters between objects for the client and server contexts 14, 18. In particular, the internal class structures 24 of the JVM instance 10 can contain object class information such as representations of the types of objects, the types of fields in the objects as well as each field's offset within a particular object type. As will be discussed in greater detail, this information may therefore enable faster iteration over each object's fields and can therefore significantly improve throughput.

FIG. 2 shows a method 26 of copying objects for in-process calls. The method 26 could be implemented in executable software as a set of logic instructions stored in a machine- or computer-readable medium such as random access memory (RAM), read only memory (ROM), programmable ROM (PROM), flash memory, etc., as fixed-functionality hardware using circuit technology such as application specific integrated circuit (ASIC), complementary metal oxide semiconductor (CMOS) or transistor-transistor logic (TTL) technology, or any combination thereof. In addition, portions of the method 26 may be implemented in JVM helper code.

Processing block 28 provides for detecting an in-process call between a client and a server, wherein the client and the server share a common virtual machine instance. A source object and a corresponding object graph may be identified for the in-process call at block 30. Illustrated block 32 provides for determining an internal class structure of the virtual machine instance and using the internal class structure to conduct an object copy from the source object to a destination object without serialization. For example, in Java™, each instance of the java.lang.Class class may have a corresponding JVM internal class structure associated with it. As will be discussed in greater detail, the JVM internal class structure can contain a bit map that can be useful in copying objects between source and destination objects. If it is determined at block 34 that another source object exists, the object copy is repeated. Otherwise, the non-serialized destination objects may be passed to the target client/server context at block 36.

Turning now to FIG. 3, one approach to conducting object copies is shown in greater detail at process 38. Thus, portions or all of the process 38 might be substituted for the object copy block 32, already discussed. To facilitate discussion, the following example of a source object may be used.

```
class A implements java.io.Serializable {
    int a;
    String s;
    Contained c;
}
class Contained implement java.io.Serializable {
    String name;
}
```

Thus, in the illustrated example, the top level object is an instance of class A in the source class loader. Processing block 40 provides for determining the internal class structure based on the type of source object involved. For example, block 40 might include a determination of the object class (e.g., "class A") and/or identity of the class loader associated with the source object. Moreover, the illustrated block 40 could include the creation of an empty destination object of the appropriate class in the destination class loader to hold the copied values. Because the same class may have a different layout (e.g., different field offsets or new fields added) in the destination class loader, the illustrated approach can iterate through the fields of the source object class in the source class loader and calculate offsets for each field of the destination object class in the destination class loader.

Thus, if it is determined at block 42 that the object class, source class loader and destination class loader combination is new, block 44 provides for identifying field offset data in the internal class structure and determining field mappings between the source object and the destination object. For example, illustrated block 44 might involve determining, for each field in the source object, a field offset for the field in the source object, calculating a field offset for the field in the destination object based on the field offset data, and establishing an association between the pair of field offsets. In the above example, an iteration can be performed over the java.lang.reflect.Field objects for class A in the source class loader, and for each field in that class a field offset calculation can be made by using native code such as the Unsafe.fieldOffset(Field) function from the Java™ class libraries (JCL). Once the field offset for a particular field in the source class loader is computed, the offset for the same field in the destination class loader can be calculated in the same manner, wherein an association may be set up between the two using any appropriate data structure (e.g., a simple array). If it is determined at block 42 that the object class, source class loader and destination class loader combination has been encountered before, the field mapping process may be bypassed.

Illustrated block 46 provides for initiating an iterative field copy for the fields of the source object. The copy of a particular field might be conducted differently depending upon the contents of the field. For example, if it is determined at block 48 that the field contains an object reference, a recursive "deep copy" can be conducted from the field based on the field mappings at block 50. In particular, each instance of the java.lang.Class class may have a corresponding JVM internal class structure associated with it. The JVM internal class structure might contain a bit map, wherein each field declared in that class can have a designated offset within the bit map, and the bit for a particular field is set if the field contains an object reference and not set if the field contains a primitive. Java™, code in the JVM helper function can use simple Java™, native interface (JNI) methods to obtain the internal class structure including the fields bit map.

Thus, if the bit for a field is set, block 50 could involve reading the corresponding field from the source object by appropriately scaling the bit index to obtain the offset of the field in the source class loader. The scaling operation might be dependent upon the bit size (e.g., 32-bit, 64-bit) of the computing system since the size of an address field would differ correspondingly. Additionally, block 50 might provide for reading the field via a call to a native function such as the JVM Unsafe.getObject(source object, source offset) function, since the field is known to contain an object reference. If the field contents are non-null, the deep copy process can be called recursively on the object referenced in the field. Once the deep copy of the field value is complete, the resulting value may be set at the appropriate offset (computed as already discussed) in the destination object via a call to a native function such as the Unsafe.putObject(destination object, destination offset) function.

A consideration of the deep copy process is the possibility of two fields referring to the same object in the source object's graph. In such a case, those fields can be configured to point to the same copied object in the destination object's graph. One approach to achieving this configuration can be to keep track of the associations between each source and destination object (e.g., in a hash table) as the deep copy is performed, and determine whether a particular source object has previously been copied. If so, the preexisting copy of the object reference may be used in the deep copy.

If the bit for a field is not set in the bit map, the field contents may be considered a primitive and block 52 can provide for conducting a copy from the value of the field in the source object to the destination object. In particular, the corresponding field may be read from the source object by appropriately scaling the bit index as already discussed. In one example, the field is read via a call to a native function such as the Unsafe.getInt(source object, source offset) since the field is known to contain a primitive value. The read value may be set at the appropriate offset (computed as already discussed) in the destination object via a call to a native function such as the Unsafe.putInt(target object, destination offset) function. If there are any remaining fields in the source object, illustrated block 54 provides for repeating the field copy for the remaining fields.

Figure 4:
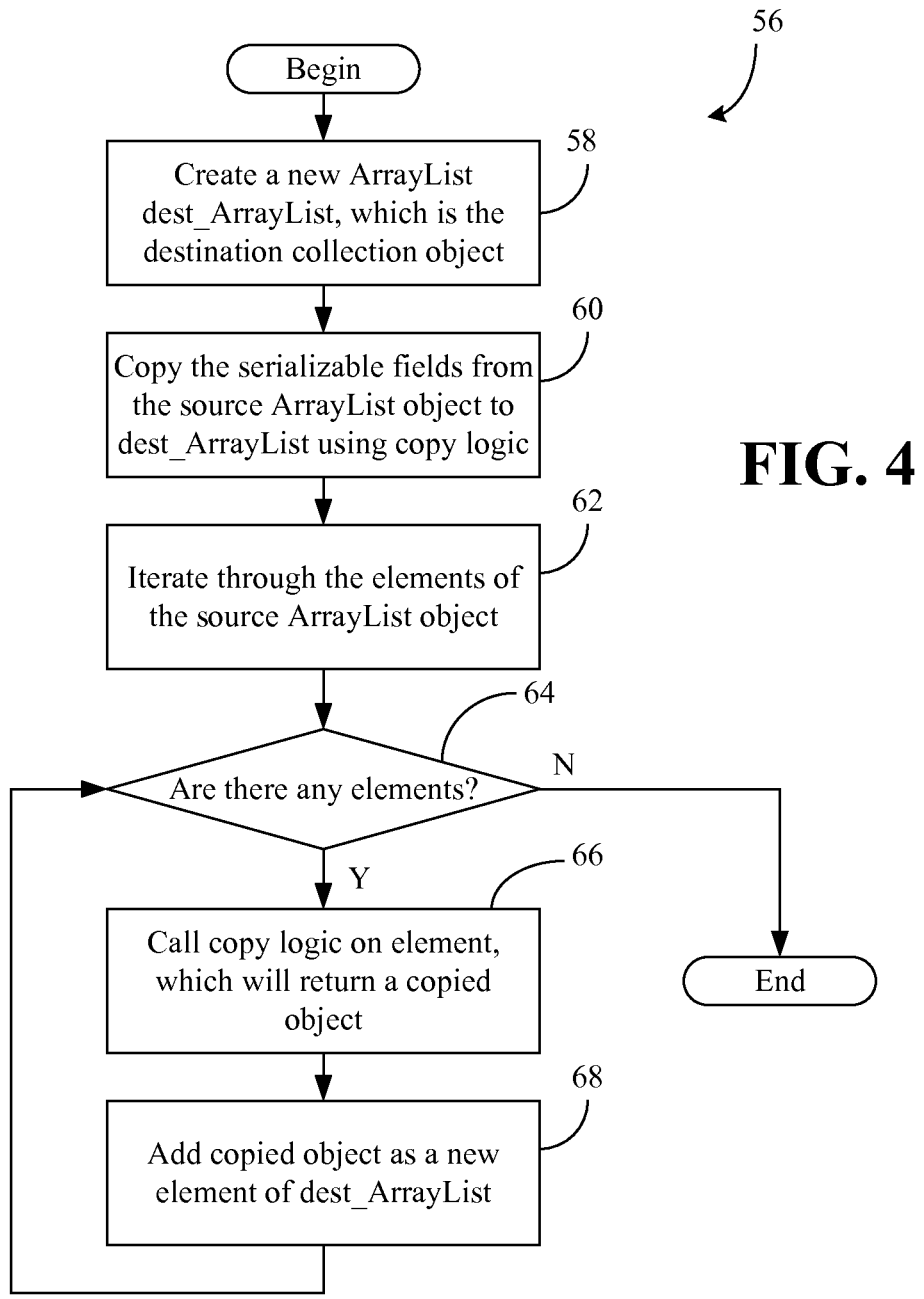
FIG. 4 is a flowchart of an example of a method of fast copying an array list system collection class according to an embodiment.

A further enhancement may be the usage of a "fast path" for copying system collection classes. System collection classes (e.g., java.util.HashMap, java.util.ArrayList, etc.) can be custom marshalled so that all the elements in the collection are serialized through the writeObject method. Since prediction of code in custom marshalled functions may be difficult, optimization of such classes can also be challenging. For system collection classes, however, the functionality in the writeObject and readObject functions may pertain to serializing-deserializing of all the elements in the collection. For objects, which are instances of the system collections, a fast path can therefore be invoked, wherein the fast path copy may generally use the following steps to achieve the deep copy:
  Create a target collection object
  Call the logic for copying the default serializable (non-custom marshalled) fields from the source object to the destination system collection object using the new deep copy logic described above
  Iterate through the source object
  Call the above-described deep copy logic on each of the objects inside the source collection and add the returned copy object to the destination system collection object FIG. 4 shows an example of a fast path copy process 56 for an ArrayList system collection object. Block 58 generally provides for determining that the object type of the source object includes a system collection object and defining the destination object as a destination system collection object. In the illustrated example, a new ArrayList "dest_ArrayList" is created as the destination collection object. A recursive deep copy from non-custom marshalled fields in the source object to the destination system collection object may be conducted at block 60. In the illustrated example, these serializable fields are copied to the dest_ArrayList object using the recursive deep copy procedure already discussed. Block 62 can provide for iterating through the elements of the source object, wherein a determination can be made at block 64 as to whether any elements remain. If so, the recursive deep copy logic may be called on the element at block 66 to obtain the copied object. Illustrated block 68 provides for adding the copied object to the destination system collection object.

Thus, foregoing the process of deflating and inflating objects associated with in-process calls can enable internal class structures to be leveraged in order to improve the performance of ORB calls in a collocated environment. In particular, the copying of parameters can be done more efficiently by iterating through the object graph and copying the values of all the nodes in the graph. The performance may be further enhanced through the use of helper functions from the Java™ Virtual Machine (JVM) and fast copy paths for specific types of objects (e.g., system collection objects). An advantage of using specialized JVM helper code to perform deep copies is that the JVM can leverage convenient internal representations for each class and it's fields that allow fast access to the information about the type of each field and it's offset within an object of that type.

Knowledge of JVM internal class structures can also enable simpler and faster iteration over the object's fields in order to complete a deep copy. Moreover, the JVM helper code could be implemented primarily in Java™ code, wherein JNI calls into the JVM are only made in order to obtain extremely simple information (e.g., is 64 Bit( ) may be one of the JNI calls made, to check if the code is being run on a 64-bit platform or not). The advantages of such an approach can be significant, since the simplicity of the JNI methods used by the VM helper code written in Java™ can mean that the JIT (just in time) compiler can easily replace a call to the recognized JNI method at compile time (e.g., the JIT compiler would see a call to is 64 Bit( ) and would be able to replace it with "true" or "false" depending on the platform). Simply put, native methods can be recognized and changed to compile time constants so that there is virtually no native code active at runtime, even though a highly optimized deep technique coupled to JVM internals is used. The results may be code that is both portable and of high performance.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:
   a non-transitory computer readable storage medium; and
   computer usable code stored on the non-transitory computer readable storage medium, where, if executed by a processor, the computer usable code causes a computer to:
   detect an in-process call between a client and a server, wherein the client and the server are to share a common virtual machine instance, and wherein the in-process call is to include a source object;
   determine an internal class structure of the common virtual machine instance based on an object type of the source object;
   conduct a field copy from the source object to a destination object based on field offset data, wherein the source object is to correspond to a first class loader and the destination object is to correspond to a second class loader;
   repeat the field copy for a plurality of fields in the source object to complete an object copy of the source object; and
   repeat the object copy for a plurality of source objects in the in-process call.

2. The computer program product of claim 1, wherein the computer usable code, if executed, further causes a computer to:
   determine a first field offset for a field in the source object;
   calculate a second field offset for the field in the destination object based on the field offset data; and
   establish an association between the first field offset and the second field offset.

3. The computer program product of claim 1, wherein the field copy includes computer usable code which, if executed, further causes a computer to:
   conduct a recursive deep copy from a field in the source object to the destination object if the field includes an object reference, wherein the deep copy is to include at least one of a use of preexisting copy of the object reference and a call of a Java™-based helper function;
   conduct a copy from a value of a field in the source object to the destination object if the field includes a primitive.

4. The computer program product of claim 1, wherein the computer usable code, if executed, further causes a computer to:
   determine that the object type of the source object includes a system collection object;
   define the destination object as a destination system collection object;
   conduct a recursive deep copy from non-custom marshalled fields in the source object to the destination system collection object;
   iterate through elements of the source object; and
   conduct a recursive deep copy from each element of the source object to the destination system collection object.

5. The computer program product of claim 1, wherein the computer usable code, if executed, further causes a computer to:
- identify at least one Java™ native interface (JNI) method in the computer usable code at a compile time;
- change the JNI method to a compile time constant; and
- use the compile time constant to identify the field offset data and conduct the field copy.

6. A computer program product comprising:
- a non-transitory computer readable storage medium; and
- computer usable code stored on the non-transitory computer readable storage medium, where, if executed by a processor, the computer usable code causes a computer to:
  - detect an in-process call between a client and a server, wherein the client and the server are to share a common virtual machine instance;
  - identify field offset data in an internal class structure;
  - conduct a field copy from the source object to the destination object based on the field offset data;
  - conduct an object copy from a source object of the in-process call to a destination object based on the internal class structure of the common virtual machine instance; and
  - repeat the object copy for a plurality of source objects in the in-process call.

7. The computer program product of claim 6, wherein the object copy includes computer usable code which, if executed, causes a computer to:
- determine the internal class structure based on an object type of the source object; and
- repeat the field copy for a plurality of fields in the source object.

8. The computer program product of claim 7, wherein the computer usable code, if executed, further causes a computer to:
- determine a first field offset for a field in the source object;
- calculate a second field offset for the field in the destination object based on the field offset data; and
- establish an association between the first field offset and the second field offset.

9. The computer program product of claim 7, wherein the field copy includes computer usable code which, if executed, causes a computer to:
- conduct a recursive deep copy from a field in the source object to the destination object if the field includes an object reference; and
- conduct a copy from a value of a field in the source object to the destination object if the field includes a primitive.

10. The computer program product of claim 9, wherein the recursive deep copy includes computer usable code which, if executed, causes a computer to at least one of use a preexisting copy of the object reference and call a Java™-based helper function.

11. The computer program product of claim 7, wherein the computer usable code, if executed, causes a computer to:
- identify at least one Java™ native interface (JNI) method in the computer usable code at a compile time;
- change the JNI method to a compile time constant; and
- use the compile time constant to identify the field offset data and conduct the field copy.

12. The computer program product of claim 6, wherein the computer usable code, if executed, further causes a computer to:
- determine that an object type of the source object includes a system collection object;
- define the destination object as a destination system collection object;
- conduct a recursive deep copy from non-custom marshalled fields in the source object to the destination system collection object;
- iterate through elements of the source object; and
- conduct a recursive deep copy from each element of the source object to the destination system collection object.

13. The computer program product of claim 6, wherein the source object is to correspond to a first class loader and the destination object is to correspond to a second class loader.

* * * * *